US011272334B2

(12) United States Patent
Ivanov et al.

(10) Patent No.: US 11,272,334 B2
(45) Date of Patent: Mar. 8, 2022

(54) DETERMINING A PATH OF A MOBILE DEVICE IN A PUBLIC TRANSPORTATION BUILDING

(71) Applicant: HERE Global B.V., Eindhoven (NL)

(72) Inventors: Pavel Ivanov, Tampere (FI); Lauri Aarne Johannes Wirola, Tampere (FI); Henri Jaakko Julius Nurminen, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/815,584

(22) Filed: Mar. 11, 2020

(65) Prior Publication Data

US 2020/0296555 A1    Sep. 17, 2020

(30) Foreign Application Priority Data

Mar. 12, 2019  (EP) .................................... 19162324

(51) Int. Cl.
*H04W 24/00* (2009.01)
*H04W 4/33* (2018.01)
(Continued)

(52) U.S. Cl.
CPC .......... *H04W 4/33* (2018.02); *G01C 21/3614* (2013.01); *H04W 4/025* (2013.01); *H04W 4/029* (2018.02); *H04W 4/42* (2018.02)

(58) Field of Classification Search
None
See application file for complete search history.

(56) References Cited

U.S. PATENT DOCUMENTS

2002/0196370 A1* 12/2002 Dagtas ................. H04N 21/434
                                                             348/600
2004/0147267 A1*  7/2004 Hill ....................... H04W 64/00
                                                             455/441
(Continued)

FOREIGN PATENT DOCUMENTS

WO     WO 2018/071798 A1    4/2018

OTHER PUBLICATIONS

Montoya, M. D., *A Personal Knowledge Base Integrating User Data and Activity Timeline*, Data Structures and Algorithms, Université Paris-Saclay, HAL Archives-Ouvertes (Feb. 28, 2018) 181 pages.
(Continued)

*Primary Examiner* — Jinsong Hu
*Assistant Examiner* — Alexander J Yi
(74) *Attorney, Agent, or Firm* — Alston & Bird LLP

(57) ABSTRACT

A method, apparatus and computer readable storage medium are provided for determining a path of a mobile device in a public transportation building. In a method, a plurality of position data items are collected. Each position data item represents a respective position parameter captured by a mobile device that is indicative of a coarse position of the mobile device when the respective position parameter was captured by the mobile device. The method also includes determining, at least partially based on the position data items and public transportation data, an arrival area and/or a departure area of the public transportation building as start and end, respectively, of the path. The method further includes determining, at least partially based on building map data, a plurality of potential paths of the mobile device in the public transportation building starting at the arrival area and/or ending at the departure area.

19 Claims, 5 Drawing Sheets

(51) Int. Cl.
      *H04W 4/42*     (2018.01)
      *H04W 4/029*   (2018.01)
      *G01C 21/36*   (2006.01)
      *H04W 4/02*     (2018.01)

(56) References Cited

U.S. PATENT DOCUMENTS

| | | | |
|---|---|---|---|
| 2005/0258957 A1* | 11/2005 | Krumm | H04L 29/06 340/539.13 |
| 2010/0144375 A1 | 6/2010 | Pfister et al. | |
| 2012/0170560 A1 | 7/2012 | Han et al. | |
| 2016/0094950 A1 | 3/2016 | Millman et al. | |
| 2016/0094954 A1* | 3/2016 | Millman | H04W 64/006 455/456.2 |
| 2016/0161592 A1 | 6/2016 | Wirola et al. | |
| 2016/0202341 A1 | 7/2016 | Burgess et al. | |

OTHER PUBLICATIONS

Thiagarajan, A. et al. *Cooperative Transit Tracking Using GPS-Enabled Smart-Phones*, SenSys'10 (Nov. 2010) 85-98.

Watanabe et al. *Tracking the Human Mobility Using Mobile Device Sensors*, IEICE Trans. Inf. & Syst., vol. E100-D, No. 8 (Aug. 2017) 1680-1690.

U.S. Appl. No. 16/687,078, filed Nov. 18, 2019; In re: Ivanov et al., entitled *Determining a Non-GNSS Based Position of a Mobile Device*.

Extended European Search Report for European Application No. 19162324.8 dated Sep. 19, 2019, 9 pages.

* cited by examiner

| | 300 | 301 | 302 | 303 | 304 | 305 |
|---|---|---|---|---|---|---|
| | Train | Arrives from train station | Departs to train station | Arrival time | Departure time | Arrives on/departs from platform |
| | TR1 | B | D | 08:00 | 08:05 | X |
| | TR2 | B | C | 08:15 | 08:20 | Y |
| | TR3 | D | C | 08:20 | 08:25 | Z |

DETERMINING A PATH OF A MOBILE DEVICE IN A PUBLIC TRANSPORTATION BUILDING

CROSS-REFERENCE TO RELATED APPLICATION

This application claims priority to European Application No. 19162324.8, filed Mar. 12, 2019, the entire contents of which are incorporated herein by reference.

FIELD OF THE DISCLOSURE

The invention relates to the field of determining a path of a mobile device in at least one public transportation building.

BACKGROUND

Satellite signal based positioning technologies, which are mainly used outdoors, are usually not suited to deliver a satisfactory performance when used for indoor positioning, since satellite radio signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, Bluetooth low energy (BLE) based positioning systems, cellular network based positioning systems and wireless local area network (WLAN) based positioning systems.

Such a non-GNSS based radio positioning system (e.g. a self-contained positioning system) may be divided in at least three stages, an installation stage, a training stage and a positioning stage.

In the installation stage, dedicated positioning support radio devices (e.g. Bluetooth beacons) may be installed in the environment for which a positioning system is to be provided. Alternatively or additionally, a non-GNSS based radio positioning system may make use of existing radio devices like WLAN access points or cellular network nodes as positioning support radio devices.

In the subsequent training stage, training data are collected. The training data may be collected in the form of radio fingerprint observation reports that are based on measurements by mobile devices. A radio fingerprint observation report may indicate an observation position and radio signal parameters obtained as a result of measurements taken from the radio interface when scanning for observable radio signals at the observation position.

The observation position may be for example GNSS based. However, when collecting radio fingerprint observation reports inside a building in the training stage, it is often not possible to determine a GNSS based indoor observation position.

Measurements taken from the radio interface may comprise, by way of example, measured received signal strengths and identifiers of radio devices (e.g. Bluetooth beacons, WLAN access points, base stations of a cellular network) transmitting the radio signals observable at the observation position. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crowd-sourcing is a background process that does not directly benefit the device user, it is desirable that the crowd-sourcing process only consumes limited resources of the device.

Alternatively or additionally, mobile devices may be used for collecting radio fingerprint observation reports in a systematic manner. Collected fingerprint data may be uploaded to a database in a positioning server or in a positioning cloud, where algorithms may be run to generate radio coverage models of positioning support devices (e.g. Bluetooth beacons, WLAN access points, base stations of a cellular network) and/or radio maps for positioning purposes.

In the positioning stage, a mobile device may estimate its current position based on own measurements taken from the radio interface and on the data or a subset of data that is available from the training stage. Radio coverage model information or radio map information that has been generated in the training stage may be provided to mobile devices by a positioning server via the Internet as assistance information for use in position estimation. Alternatively, radio coverage model information and/or radio map information may be stored in a positioning server to which the mobile devices may connect to via the Internet for obtaining a position estimate.

SUMMARY OF SOME EMBODIMENTS OF THE INVENTION

According to an exemplary aspect of the invention, a method for determining a path of a mobile device in at least one public transportation building is disclosed, wherein the method comprises:

collecting a plurality of position data items, wherein each of the plurality of position data items represents a respective position parameter captured by the mobile device that is indicative of a coarse position of the mobile device at which the mobile device was located when the respective position parameter was captured by the mobile device;

determining, at least partially based on the plurality of position data items and public transportation data, an arrival area of the public transportation building as start of the path and/or a departure area of the public transportation building as end of the path;

determining, at least partially based on building map data of the public transportation building, a plurality of potential paths of the mobile device in the public transportation building starting at the arrival area of the public transportation building and/or ending at the departure area of the public transportation building.

The disclosed method may be performed by at least one apparatus (e.g. any one embodiment of the apparatus(es) disclosed below). For example, the disclosed method may be performed by the mobile device or by a remote device (i.e. a device different from or remote to the mobile device) like a server (e.g. a positioning server). Alternatively, the mobile device and the remote device may cooperate to perform the disclosed method.

The mobile device may be an Internet-of-Thing (IoT) device, a smart home device, a smartphone, a tablet computer, a notebook computer, a smart watch, and a smart band.

A path of the mobile device in the public transportation building may be understood to be a path of a user carrying the mobile device, for example the user may move or may have moved (e.g. walked, run) along the path. For example, the path may start at an entrance where the user enters or has entered the public transportation building or at an arrival area where the user arrives or has arrived at the public transportation building and may end at an exit or departure area where the user leaves or has left the public transportation building. An entrance of the public transportation building may be a location where the public transportation building can be entered (e.g. when not travelling on board of a public transportation vehicle) and an exit of the public transportation building may be a location where the public transportation building can be left (e.g. when not travelling on board of a public transportation vehicle), for example an entrance or exit of the public transportation building may be a gate or a door. An arrival area of the public transportation building may be an area for passengers of public transportation vehicles arriving at the public transportation building, for example passengers may deboard from a public transportation vehicle at such an arrival area or enter the public transportation building at such an arrival area after deboarding from a public transportation vehicle. A departure area of the public transportation building may be an area for passengers of public transportation vehicles departing from the public transportation building, for example passengers may leave the public transportation building at such a departure area before boarding a public transportation vehicle or may board a public transportation vehicle at such a departure area.

Public transportation may be understood to relate to transport of passengers by group travel systems available for use by the general public, typically managed on a schedule and operated on established travel routes in a public transportation system like transportation of passenger by railways, airlines, buses or ferries. Accordingly, exemplary public transportation vehicles are a train, an airplane, a bus or a ferry; and exemplary public transportation buildings are an airport or airport building, a train station or train station building, a bus terminal or bus terminal building, or a ferry terminal or ferry terminal building; and an exemplary arrival area of such a public transportation building or an exemplary departure area of such a public transportation building is a gate of an airport or airport building, a platform of a train station or train station building, a platform of a bus terminal or bus terminal building, or a gangway of a ferry terminal or ferry terminal building. Therein, a public transportation building may be understood to also refer to a complex of one or more public transportation building(s) like a complex of one or more airport buildings.

The at least one public transportation building which is also referred to in the following as the public transportation building may be one of a plurality of predetermined public transportation buildings. For example, it may be predetermined that the disclosed method should be applied with respect to each of the plurality of predetermined public transportation buildings. For example, the public transportation building or each of the plurality of predetermined public transportation buildings may be a respective predetermined public transportation building for which a non-GNSS based indoor positioning system as disclosed above is provided which may for example be in the training stage.

A parameter (e.g. a motion parameter, a position parameter or a radio signal parameter) may be captured by the mobile device by capturing (e.g. measuring) a value of a physical quantity by the mobile device (e.g. by a sensor of the mobile device) and, optionally, by determining the parameter at least partially based on the captured value of the physical quantity. Accordingly, the captured parameter (e.g. a motion parameter, a position parameter or a radio signal parameter) may correspond to the captured value of the physical quantity or may at least partially be based on the captured value of the physical quantity. As a result of capturing such a parameter (e.g. a motion parameter, a position parameter or a radio signal parameter) by the mobile device, a data item (e.g. a position data item, a motion data item or a radio fingerprint observation report) representing the captured parameter may be generated by the mobile device.

Collecting a plurality of data items (e.g. position data items, motion data items, radio fingerprint observation reports) may be understood to mean that the plurality of data items are stored (e.g. in memory means of an apparatus performing the disclosed method). As disclosed above, the data items of the plurality of data items may be (e.g. subsequently) generated by the mobile device. Accordingly, if the plurality of data items is collected by the mobile device, the plurality of data items may be obtained (e.g. subsequently) as a result of (e.g. subsequently) generating the data items of the plurality of data items. However, if the plurality of data items is collected by a remote device like a server, the plurality of data items may be obtained by receiving the plurality of data items from the mobile device (e.g. the data items of the plurality of data items may be received at once or subsequently from the mobile device).

Examples of such pluralities of data items are the plurality of position data items, a plurality of motion data items as disclosed below and a plurality of radio fingerprint observation reports as disclosed below.

Each of the plurality of position data items represents a respective position parameter captured by the mobile device. Moreover, each position parameter represented by the plurality of position data items is indicative of a coarse position at which the mobile device was located when the respective position parameter was captured by the mobile device. That such a respective position parameter is indicative of a coarse position may be understood to mean both (1) it indicates a predetermined area covering the (e.g. absolute) position of the mobile device (e.g. by representing or containing an identifier of or an index to the predetermined area) or (2) it indicates a (e.g. absolute) position of the mobile device (e.g. by representing or containing geographic position coordinates representing the position of the mobile device). For example, the predetermined area indicated by such a respective position parameter may be part of a plurality of predetermined areas.

An example of such a predetermined area is a coverage area of a radio device like a basis station of a cellular communication network or a wireless access point of a wireless communication network. Accordingly, a position parameter (e.g. each position parameter represented by the plurality of position data items) may be determined at least partially based on one or more radio signals captured by a radio sensor (e.g. a radio interface) of the mobile device, for example by extracting, from each of the captured one or more radio signals, a respective identifier like a name, an address (e.g. a MAC address or an IP address), an universally unique identifier (UUID), a service set identifier (SSID), a basic service set identifier (BSSID), cell identifier (Cell ID), or a combination thereof. The respective identifier(s) may be indicative of the coverage area covering the absolute position of the mobile device when the one or more radio signals were captured. Accordingly, the respective identifiers extracted from the captured one or more radio signals may serve as position parameters represented by the plurality of position data items. It is however to be understood that the invention is not limited thereto.

It is to be understood that the mobile device may repeatedly (e.g. periodically) capture a position parameter such that the plurality of position data items represents a sequence of position parameters captured by the mobile device. Accordingly, the plurality of position data items may be indicative of at least a sequence of coarse positions at which the mobile device was located which is indicated by the sequence of position parameters represented by the plurality of position data items.

Determining, at least partially based on the plurality of position data items and public transportation data, the arrival area of the public transportation building as start of the path and/or the departure area of the public transportation building as end of the path may be understood to mean that the determining depends on or is a function of both (1) one or more of the plurality of position data items and (2) the public transportation data.

It is to be understood that this determining step (i.e. determining an arrival area of the public transportation building as start of the path and/or a departure area of the public transportation building as end of the path) may comprise determining at least one of (1) one or more stations of a public transportation system at which the mobile device was located according to one or more coarse positions of the mobile device indicated by one or more position parameters of the position parameters represented by the plurality of position data items (2) an arrival time of the mobile device at at least one of the one or more stations of the public transportation system, (3) a departure time of the mobile device from at least one of the one or more stations of the public transportation system, (4) a travel time of the mobile device for travelling between at least two subsequent stations of the one or more stations, (5) at least one potential travel route of the mobile device in the public transportation system. For example, the at least one public transportation building may be a station (e.g. a departure station, a transit station or an arrival station) on the travel route, and the arrival area may be an arrival area for passengers of public transportation vehicle(s) travelling in the public transportation system on the travel route, and the departure area may be a departure area for passengers of public transportation vehicle(s) travelling in the public transportation system on the travel route.

A potential path may be understood to be a path along which a person may move (e.g. may be allowed to move) in the public transportation building from an entrance or arrival area to an exit or departure area. Moreover, the plurality of potential paths may be understood to comprise more than one (e.g. any) potential paths in the public transportation building. For example, if an arrival area of the public transportation building is/was determined to be a start of the path, the plurality of potential paths may be determined such that they comprise more than one (e.g. any) path in the public transportation building from this arrival area to more than one (e.g. any) exit or departure area. If a departure area of the public transportation building is/was determined to be an end of the path, the plurality of potential paths may be determined such that they comprise more than one (e.g. any) path in the public transportation building from more than one (e.g. any) entrance or arrival area to this departure area. If an arrival area of the public transportation building is/was determined to be a start of the path and a departure area of the public transportation building is/was determined to be an end of the path, the plurality of potential paths may be determined such that they comprise more than one (e.g. any) path in the public transportation building from this arrival area to this departure area.

That the plurality of potential paths of the mobile device in the public transportation building is determined at least partially based on building map data of the public transportation building may be understood to mean that the determining depends on or is a function of the building map data of the public transportation building. The building map data of the public transportation building may represent a plurality of links in the public transportation building along which a person (e.g. a user carrying the mobile device or a passenger of a public transportation vehicle) may move (e.g. may be allowed to move). For example, each of the plurality of links may be an interconnection between (1) two locations (e.g. an entrance or exit), (2) two areas (e.g. an arrival or departure area) or (3) a location and an area of the public transportation building. Accordingly, the plurality of potential paths may be determined such that each of the plurality of potential paths is represented by one or more links of the plurality of links represented by the building map data (e.g. one or more links of the plurality of links interconnecting a respective entrance or arrival area and a respective exit or departure area of the public transportation building).

One or more potential paths of the plurality of potential paths of the mobile device in the public transportation building may be considered or determined to be the path of the mobile device in the public transportation building. To give a non-limiting example, it may for example be determined that the shortest potential paths of the plurality of potential paths of the mobile device in the public transportation building is to be considered or determined to be the path of the mobile device in the public transportation building. As disclosed in more detail below, it may alternatively or additionally be determined that the potential paths of the plurality of potential paths of the mobile device in the public transportation building that match with a sequence or a subsequence of a sequence of motion activities indicated by a plurality of motion data items is to be considered or determined to be the path of the mobile device in the public transportation building.

It is however to be understood that potential path considered or determined to be the path of mobile device in the public transportation building may deviate from the real path of the mobile device in the public transportation building.

The disclosed method thus allows determining a path of the mobile device in the public transportation building even if it is not possible to determine a GNSS-based position of the mobile device or if there is no radio map of a non-GNSS based radio positioning system for the public transportation building available (e.g. because it is in the training stage).

According to a further exemplary aspect of the invention, an apparatus is disclosed, wherein the apparatus comprises means for performing the steps of any one embodiment of the disclosed method or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(es) may be (a) module(s) or component(s) for (a) mobile device(s) or (a) server(s), for example (a) chip(s) or chipset(s). Alternatively, the disclosed apparatus(es) may be (a) mobile device(s) or (a) server(s). The mobile device may be configured for determining its position based on a non-GNSS based radio positioning system as disclosed above, for example a Bluetooth, WLAN or cellular based radio positioning system or a combination thereof. The server may be a positioning server of such a non-GNSS based radio positioning system.

It is to be understood that the disclosed apparatus(es) may comprise only the disclosed components (e.g. means) or may further comprise one or more additional components (e.g. means). Examples of such additional components are a radio interface (e.g. a receiver, a transmitter and/or a transceiver), a data interface, a user interface (e.g. a touch-sensitive display, a keyboard, a touchpad, a display, etc.), a sensor, etc.

According to a further exemplary aspect of the invention, a positioning system is disclosed which comprises at least one of the disclosed apparatus(es), for example a mobile device and a positioning server.

As disclosed above, the positioning server may be configured to receive a plurality of radio fingerprint observation reports during the training stage and to determine a radio map for a predetermined environment at least partially based on the plurality of radio fingerprint observation reports. The positioning server may be further configured to provide the radio map to the mobile device to enable the mobile device to estimate (e.g. determine) its position based on radio signals observed at a certain position of the mobile device if the mobile device is located within the predetermined environment.

The positioning server may be part of a plurality of servers (e.g. forming a positioning cloud) or may be represented by such a plurality of servers (e.g. forming a positioning cloud).

According to a further exemplary aspect of the invention, a non-transitory computer readable storage medium is disclosed, in which computer program code is stored. The computer program code causes an apparatus to perform any one embodiment of the disclosed method (e.g. the steps of any one embodiment of the disclosed method) when executed by a processor or by a plurality of processors. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus to perform any one embodiment of the disclosed method (e.g. the steps of any one embodiment of the disclosed method).

The disclosed method, apparatus(es), system, non-transitory computer readable storage medium and computer program code may be for determining a path of a mobile device in at least one public transportation building.

In the following, further features and embodiments of these exemplary aspects of the invention will be described.

According to an exemplary embodiment of the invention, each of the plurality of position data items represents a respective capture time indicating when the respective position parameter was captured by the mobile device. To this end, each position data item may contain a respective time stamp representing the capture time, for example in Unix-time or as combined date and time representation as specified in the ISO 8601 specification.

According to an exemplary embodiment of the invention, the disclosed method further comprises:

collecting a plurality of motion data items, wherein each of the plurality of motion data items represents a respective motion parameter captured by the mobile device that is indicative of a respective motion activity of a user carrying the mobile device when the respective position parameter was captured by the mobile device such that the plurality of motion data items is indicative of a sequence of motion activities;

determining one or more of the plurality of potential paths of the mobile device in the public transportation building that match with the sequence or a subsequence of the sequence of motion activities indicated by the plurality of motion data items.

Each of the plurality of motion data items represents a respective motion parameter captured by the mobile device. Moreover, each motion parameter represented by the plurality of motion data items is indicative of a respective motion activity of a user carrying the mobile device when the respective position parameter was captured by the mobile device. Examples of such a motion activity are moving, walking, running, ascending, descending, turning, stationary, or a combination thereof. Accordingly, a motion parameter may be captured by an activity sensor of the mobile device.

It is to be understood that the mobile device may repeatedly (e.g. periodically) capture a motion parameter such that the plurality of motion data items represents a sequence of motion parameters captured by the mobile device. That the plurality of motion data items is indicative of a sequence of motion activities may accordingly be understood to mean that this sequence of motion activities is indicated by the sequence of motion parameters represented by the plurality of motion data items.

Determining one or more of the plurality of potential paths of the mobile device in the public transportation building that match with the sequence or a subsequence of the sequence of motion activities indicated by the plurality of motion data items may be performed by means of a matching algorithm, for example by means of a particle filter or a path matching algorithm. At least one of the plurality of potential paths of the mobile device in the public transportation building that is determined to match with the sequence or a subsequence of the sequence of motion activities indicated by the plurality of motion data items may then be considered or determined to be the path of the mobile device in the public transportation building.

For example, determining one or more of the plurality of potential paths of the mobile device in the public transportation building that match with the sequence or a subsequence of the sequence of motion activities indicated by the plurality of motion data items may be understood to mean that one of the plurality of potential paths that matches best with the sequence or the subsequence of the sequence of motion activities indicated by the plurality of motion data items is determined. For example, the potential path of the plurality of potential paths that is determined to be best matching with the sequence or a subsequence of the sequence of motion activities indicated by the plurality of motion data items may be considered or determined to be the path of the mobile device in the public transportation building. It is however to be understood that potential path considered or determined to be the path of mobile device in the public transportation building may deviate from the real path of the mobile device in the public transportation building.

In certain exemplary embodiments of the invention, each of the plurality of motion data items represents a respective capture time indicating when the respective motion parameter was captured by the mobile device. To this end, each motion data item may contain a respective time stamp representing the capture time, for example in Unix-time or as combined date and time representation as specified in the ISO 8601 specification.

If each of the plurality of motion data items represents a respective capture time, the plurality of motion data items is indicative of the motion duration of continuous motion activities of the sequence of motion activities indicated by the plurality of motion data items. Therein, such a continuous motion activity may be understood to be a subsequence of the sequence of motion activities indicated by the plurality of motion data items and the motion duration of such a continuous motion activity may be understood to be the time period between the capture time represented by the first motion data item and the last motion data item of the plurality of motion data items that are indicative of this subsequence.

In certain exemplary embodiments of the invention, the motion parameters represented by the plurality of motion data items are captured by one or more activity sensors or determined based on values of physical quantities captured by one or more activity sensors. For example, the activity sensors may be part of the mobile device. However, these activity sensors may be as well part of an external device (e.g. a smart watch, a fitness tracker, etc.). Moreover, the activity sensors may be partially part of the mobile device and partially part of the external device. It is to be understood that motion parameters or values of physical quantities captured by activity sensors that are part of such an external device may be received by the mobile device from the external device.

Examples of such activity sensors are a speed sensor configured for capturing a speed value of the mobile device, an acceleration sensor configured for capturing an acceleration value of the mobile device, a step sensor configured for capturing a step length or step count of a user carrying the mobile device, a pressure sensor (e.g. a barometer) configured for capturing an atmospheric pressure experienced by the mobile device, an orientation sensor (e.g. a compass or gyroscope) configured for capturing an orientation of the mobile device, a motion direction sensor (e.g. a compass or gyroscope) configured for capturing a direction of a motion of the mobile device.

For example, for each motion activity, one or more respective characteristic values or characteristic value ranges or characteristic changes in values of physical quantities may be predetermined such that one or more motion parameters captured by the mobile device may be determined to be indicative of the respective motion activity if they represent values of physical quantities matching these one or more respective characteristic values or characteristic value ranges or characteristic.

As disclosed above, examples of a motion activity are moving, walking, running, ascending, descending, turning, stationary, or a combination thereof. To give a few non-limiting examples, a predetermined characteristic speed value for "stationary" may be a speed value equal to 0 km/h, a predetermined characteristic speed value range for "walking" may be a speed value greater than 0 km/h and less than 6 km/h, and a predetermined characteristic speed value range for "running" may be a speed value greater than or equal to 6 km/h and less than 12 km/h, a predetermined characteristic change of atmospheric pressure values for "descending" may be a (e.g. steady) increase of atmospheric pressure values, a predetermined characteristic change of atmospheric pressure values for "ascending" may be an (e.g. steady) decrease of atmospheric pressure values, a change of direction or orientation may be predetermined to be characteristic for "turning".

In certain exemplary embodiments of the invention, one or more motion activities of the sequence of motion activities indicated by the plurality of motion data items are at least one of moving, walking, running, ascending, descending, turning, stationary, or a combination thereof.

According to an exemplary embodiment of the invention, each of the plurality of potential paths of the mobile device in the public transportation building is indicative of or associated with a sequence of motion activities. For example, one or more motion activities of a respective sequence of motion activities indicated by or associated with a respective one of the plurality of potential paths are at least one of moving, walking, running, ascending, descending, turning, stationary, or a combination thereof.

According to an exemplary embodiment of the invention, the building map data of the public transportation building represents a graph.

In certain exemplary embodiments of the invention, the graph may be a weighted graph and/or a directed graph.

The graph may comprise a plurality of nodes and a plurality of edges.

Each of the plurality of nodes may represent a respective location or a respective area of the public transportation building. Examples of such a location are an entrance, an exit or an intersection of two or more interconnections; and examples of such an area are an arrival area or a departure area.

Each of the plurality of edges may join two of the plurality of nodes or join one of the plurality of nodes with itself (i.e. forming a loop). It is to be understood that there may be more than one edge of the plurality of edges joining two of the plurality of nodes. Each of the plurality of edges joining two of the plurality of nodes may represent an interconnection between the area(s) and/or location(s) represented by the two nodes. Examples of such an intersection are a hallway, a stairway, an elevator or an escalator. Each of the plurality of edges joining one of the plurality of nodes with itself (i.e. forming a loop) may represent the possibility to stay at the area or location represented by the node.

In certain exemplary embodiments of the invention, one or more (e.g. each) of the plurality of edges may be associated with at least one motion activity. For example, the at least one motion activity associated with such an edge may be an expected motion activity of a person moving along the intersection represented by the edge. To give a few non-limiting examples: an edge representing a hallway may be associated with "walking" or "running" as motion activities; an edge representing stairs may be associated with "moving" in combination with "descending" or "ascending" as motion activities; an edge representing an elevator may be associated with "stationary" in combination with "descending" or "ascending" as motion activities; and an edge representing an escalator may be associated with "walking" in combination with "descending" or "ascending" as motion activities. An edge joining one of the plurality of nodes with itself (i.e. forming a loop) may be associated with "stationary" as motion activity.

Alternatively or additionally, one or more (e.g. each) of the plurality of edges may be associated with a motion duration. For example, the motion duration associated with such an edge may represent how long it is expected to take for a user carrying the mobile device to move along the intersection represented by the edge.

Alternatively or additionally, one or more (e.g. each) of the plurality of edges may be associated with a validity time period. For example, the validity time period associated with such an edge may represent a time period within which it is expected that it is possible (e.g. allowed) for a user carrying the mobile device to move along the intersection represented by the edge.

It is to be understood that the building map data may represent the graph by representing the plurality of nodes and the plurality of edges. Moreover, the building map data may optionally represent motion activities and/or motion durations and/or validity time periods associated with the plurality of edges. For example, such motion activities and/or motion durations and/or validity time periods may be represented as features and/or labels and/or weights of the plurality of edges.

If the building map data of the public transportation building represents the graph as disclosed above, each of the plurality of potential paths of the mobile device in the public transportation building may be represented by a respective subgraph of the graph represented by the building map data of the public transportation building.

For example, each subgraph representing a respective one of the plurality of potential paths of the mobile device in the public transportation building comprises at least two nodes (e.g. at least two node of the plurality of nodes of the graph) and one or more edges (e.g. one or more edges of the plurality of edges of the graph). One of the at least two nodes of such a subgraph may represent an entrance or arrival area as start of the potential path; another one of the at least two nodes of such a subgraph may represent an exit or departure area as end of the potential path; and any further node of such a subgraph may represent an intermediate location or area on the potential path. The one or more edges of such a subgraph may join the at least two nodes of the subgraph. Optionally, such a subgraph may comprise one or more further edges joining one of the at least two nodes of the subgraph with itself.

Moreover, each subgraph representing a respective one of the plurality of potential paths of the mobile device in the public transportation building may be indicative of or associated with a sequence of motion activities. For example, the at least two nodes and the one or more edges of each subgraph may define a sequence of the one or more edges from the node representing the entrance or arrival area as start of the potential path to the node representing the exit or departure area as end of the potential path (i.e. the first edge of the sequence of edges is the edge joining the node representing the entrance or arrival area with another node and the last edge of the sequence of edges is the edge joining the node representing the exit or departure area with another node). Such a sequence of edges may for example be understood to be indicative of a corresponding sequence of motion activities, for example by indicating at least one of (1) a number of motion activities of the sequence of motion activities, (2) motion activities of the sequence of motion activities, (3) motion durations of motion activities of the sequence of motion activities. For example, if the sequence of edges comprises a certain number of subsequent edges (e.g. three), it may be understood to be indicative of a sequence of motion activities having the same number of subsequent motion activities (e.g. three motion activities). Moreover, if each edge of the sequence of edges is associated with a respective motion activity, it may be understood to be indicative of a sequence of motion activities comprising the motion activities associated with the edges of the sequence of edges in the sequence of the sequence of edges. Likewise, if each edge of the sequence of edges is associated with a respective motion duration, it may be understood to be indicative of a sequence of motion durations comprising the motion durations associated with the edges of the sequence of edges in the sequence of the sequence of edges.

Determining one or more of the plurality of potential paths of the mobile device in the public transportation building that match with the sequence or a subsequence of the sequence of motion activities indicated by the plurality of motion data items as disclosed above may thus comprise determining, for each of the plurality of potential path, the sequence of motion activities indicated by the subgraph (e.g. by the at least two nodes and the one or more edges of the subgraph) representing the respective potential path of the plurality of potential paths that matches best with the sequence or the subsequence of the sequence of motion activities indicated by the plurality of motion data items. It is to be understood that the determining may be performed by means of a matching algorithm. At least one of the plurality of potential paths that is represented by the subgraph indicative of the sequence of motion activities that is determined to be matching with the sequence or a subsequence of the sequence of motion activities indicated by the plurality of motion data items may then be considered or determined to be the path of the mobile device in the public transportation building. For example, the potential path of the plurality of potential paths that is represented by the subgraph indicative of the sequence of motion activities that is determined to be best matching with the sequence or a subsequence of the sequence of motion activities indicated by the plurality of motion data items may be considered or determined to be the path of the mobile device in the public transportation building.

According to an exemplary embodiment of the invention, the public transportation data represent at least one of (1) one or more positions of one or more stations in a public transportation system, (2) a departure time schedule for public transportation vehicles (e.g. public transportation vehicles travelling on a travel route in the public transportation system), (3) an arrival time schedule for public transportation vehicles (e.g. public transportation vehicles travelling on a travel route in the public transportation system), (4) a route map of the public transportation system (e.g. a route map representing one or more travel routes of one or more public transportation vehicles in the public transportation system), (5) arrival or departure areas for passengers of public transportation vehicles. The public transportation data may for example be part of a public transportation database, for example provided by one or more database servers of a public transportation service or a third party service.

The one or more (e.g. absolute) positions of one or more stations in a public transportation system may for example be represented in the form of geographic coordinates of the one or more positions by the public transportation data.

A departure time schedule for public transportation vehicles (e.g. public transportation vehicles travelling on a travel route in the public transportation system), an arrival time schedule for public transportation vehicles (e.g. public transportation vehicles travelling on a travel route in the public transportation system), and arrival or departure areas for passengers of public transportation vehicles (e.g. public transportation vehicles travelling on a travel route in the public transportation system) are typically represented by a public transportation timetable (e.g. an public transportation timetable of the public transportation building). Accordingly, the public transportation data may represent such a public transportation timetable (e.g. a public transportation timetable of public transportation building).

A route map of the public transportation system may be understood to represent one or more travel routes of one or more public transportation vehicles in the public transportation system. It is to be understood that such a route map may be represented by a graph comprising a plurality of edges and a plurality of nodes, wherein each of the plurality of nodes represent a respective station of the public transportation system and each of the plurality of edges represents a link between two stations of the public transportation system. Accordingly, the public transportation data may represent the route map of the public transportation system by means of such a graph.

According to an exemplary embodiment of the invention, the determining the arrival area of the public transportation building as start of the path and/or the departure area of the public transportation building as end of the path comprises determining, at least partially based on at least one of the plurality of position data items and the public transportation data, at least one of:

one or more stations of a public transportation system at which the mobile device was located according to one or more coarse positions of the mobile device indicated by one or more of the position parameters represented by the plurality of position data items;

a respective arrival time of the mobile device at at least one of the one or more stations of the public transportation system;

a respective departure time of the mobile device from at least one of the one or more stations of the public transportation system;

a travel time of the mobile device for travelling between at least two subsequent stations of the one or more stations of the public transportation system;

at least one potential travel route of the mobile device in the public transportation system (e.g. a potential travel route of the mobile device including the one or more stations of the public transportation system).

The determining the arrival area of the public transportation building as start of the path and/or the departure area of the public transportation building as end of the path may for example comprise one or more (e.g. subsequent or parallel) of these determining steps.

One or more stations of a public transportation system at which the mobile device was located according to one or more coarse positions of the mobile device indicated by one or more position parameters of the position parameters represented by the plurality of position data items may be determined. For example, the public transportation building is one of the one or more stations.

As disclosed above, the public transportation data may represent, for each station of the public transportation system, a respective (e.g. absolute) position of the respective station (e.g. in the form of geographic coordinates of the one or more positions). Accordingly, each of the one or more stations of the public transportation system at which the mobile device was located according to one or more coarse positions of the mobile device indicated by one or more position parameters of the position parameters represented by the plurality of position data items may be determined based on the respective position of the respective station of the public transportation system represented by the public transportation data. For example, it may be determined that the mobile device was located at a respective station of the public transportation system if the respective position of the respective station of the public transportation represented by the public transportation data is equal to or less than a predetermined distance threshold from a coarse position of the mobile device indicated by a respective position parameter represented by a respective one of the plurality of position data items.

Furthermore, each of the plurality of position data items may represent a respective capture time indicating when the respective position parameter was captured by the mobile device as disclosed above.

Accordingly, a (e.g. chronological) sequence of the one or more stations of the public transportation system representing the (e.g. chronological) sequence in which the mobile device was located at these one or more stations may be determined based on such capture times. For example, such a (e.g. chronological) sequence of the one or more stations of the public transportation system may be determined based on the capture times indicating when the position parameters were captured by the mobile device that are indicative of a respective coarse position of the mobile device which is equal to or less than a predetermined distance threshold from a respective position of a respective station of the public transportation system.

Moreover, the respective arrival time of the mobile device at at least one (e.g. each) of the one or more stations of the public transportation system and the respective departure time of the mobile device from at least one (e.g. each) of the one or more stations of the public transportation system may be also determined based on such capture times. For example, the respective arrival time of the mobile device at a respective one (e.g. the at least one) of the one or more stations of the public transportation system may be determined to be the earliest capture time of the capture times indicating when (e.g. subsequent) position parameters were captured by the mobile device that are indicative of a respective coarse position of the mobile device which is equal to or less than a predetermined distance threshold from the respective position of the respective station of the public transportation system. Likewise, the respective departure time of the mobile device from a respective one (e.g. the at least one) of the one or more stations of the public transportation system may be determined to be the latest capture time of the capture times indicating when (e.g. subsequent) position parameters were captured by the mobile device that are indicative of a respective coarse position of the mobile device which is equal to or less than a predetermined distance threshold from the respective position of the respective station of the public transportation system.

A travel time of the mobile device for travelling between at least two subsequent stations of the one or more stations of the public transportation system (e.g. at least two subsequent stations of the (e.g. chronological) sequence of the one or more stations of the public transportation system) may be determined to be the time difference between the departure time from the first station of these at least two subsequent stations and the arrival time at the second station of these at least two subsequent stations.

The at least one potential travel route of the mobile device in the public transportation system may be determined based on the public transportation data such that it includes the determined one or more stations of the public transportation system at which the mobile device was located and (e.g. best) matches the determined arrival time(s), departure time(s) and travel time(s). For example, the at least one potential travel route of the mobile device in the public transportation system may be determined by means of a matching algorithm identifying the most likely potential travel route of the mobile device in the public transportation system which includes the determined one or more stations of a public transportation system at which the mobile device was located and best matches the determined arrival time(s), departure time(s) and travel time(s). To this end, a public transportation timetable of the public transportation building and a route map of the public transportation system represented by the public transportation data may for example be considered by the matching algorithm. It is however to be understood that the invention is not limited to this.

As disclosed above, the public transportation building may be one of the one or more stations. In particular, the public transportation building may be one of the one or more stations included by the at least one potential travel route of the mobile device in the public transportation system. Moreover, the arrival area of the public transportation building may be an arrival area for passengers of public transportation vehicles travelling on the travel route and/or the departure area of the public transportation building may be a departure area for passengers of public transportation vehicles travelling on the travel route.

The public transportation data may represent arrival or departure areas for passengers of public transportation vehicles as disclosed above. Accordingly, the arrival area of the public transportation building as start of the path and/or the departure area of the public transportation building as end of the path may be determined based on this information and the determined at least one potential travel route of the mobile device in the public transportation system. For example, the arrival area of the public transportation building may be determined to be an arrival area for passengers of a public transportation vehicle travelling on the at least one potential travel route of the mobile device and arriving at the public transportation building represented by the public transportation data. Likewise, the departure area of the public transportation building may be an area for passengers of public transportation vehicles travelling on the at least one potential travel route of the mobile device and departing from the public transportation building represented by the public transportation data. It is however to be understood that other or further information like arrival time at the public transportation building or a departure time from the public transportation building may be considered in the determining.

According to an exemplary embodiment of the invention, the disclosed method further comprises:

collecting a plurality of radio fingerprint observation reports captured by the mobile device.

Each of the plurality of radio fingerprint observation reports represents one or more respective radio signal parameters captured (e.g. measured and/or determined) by the mobile device (e.g. by a radio sensor like a radio interface of the mobile device) at a respective observation position. It is to be understood that the mobile device may repeatedly (e.g. periodically) scan for observable radio signals such that the plurality of radio fingerprint observation reports represents a sequence of radio signal parameters captured by the mobile device when scanning for observable radio signals.

A radio signal parameter (e.g. each radio signal parameter represented by the plurality of radio fingerprint observation reports) may be indicative of or characteristic for one or more radio signals observable at the observation position where the radio signal parameter is/was captured by the mobile device. Therein, a radio signal may be understood to be observable at a certain observation position if the radio signal is receivable with a minimum quality (e.g. a minimum signal-to-noise ratio and/or a minimum signal power, e.g. at least −90 dbm or −95 dbm) at this observation position. For example, the mobile device may determine at least one respective radio signal parameter for each radio signal observed at a certain observation position. The determined radio signal parameters may then for example be represented by a radio finger print observation report generated by the mobile device for this observation position.

Examples of radio signal parameters represented by a radio fingerprint observation report are an identifier of a radio signal, a signal quality parameter, a received signal strength parameter or a signal-to-noise ratio parameter.

An identifier of a radio signal may be understood to mean information contained in an observable radio signal which is configured to enable identifying the radio signal and/or distinguishing the radio signal from other radio signals. An example for such an identifier of a radio signal is an identifier of a radio device transmitting the radio signal like a like a name, an address (e.g. a MAC address or an IP address), an universally unique identifier (UUID), a service set identifier (SSID), a basic service set identifier (BSSID), or a combination thereof. For example, the identifiers of such a radio signals may be obtained by extracting the identifier from the observed radio signal.

A signal quality parameter may be understood to mean information indicating the reception quality of an observable radio signal. Examples of such signal quality parameters are a received signal strength parameter and a signal-to-noise ratio parameter.

A received signal strength parameter may represent the receiving power of an observed radio signal. In other words, the received signal strength parameter may represent the receiving power of a radio signal observed by the mobile device when scanning for observable radio signals. For example, the mobile device may measure the receiving power of a radio signal observed by the mobile device when scanning for observable radio signals. An example, of a received signal strength parameter is a received signal strength indicator (RSSI) or a physical receiving power level (e.g. a Rx power level) in dBm.

A signal-to-noise ratio parameter may represent a ratio of the receiving power of an observed radio signal and the receiving power of observed background noise. For example, when scanning for observable radio signals, the mobile device may measure the receiving power of a radio signal observed by the mobile device and the receiving power of the background noise observed by the mobile device. An example, of a signal-to-noise ratio parameter is a value representing the ratio of the receiving power of an observed radio signal and the receiving power of observed background noise in dB.

For example, each of the plurality of radio fingerprint observation reports may represent at least one of these exemplary radio signal parameters (i.e. an identifier of a radio signal, a signal quality parameter, a received signal strength parameter or a signal-to-noise ratio parameter).

Alternatively or additionally, each of the plurality of radio fingerprint observation reports may represent a respective capture time indicating when the respective radio fingerprint observation report was captured by the mobile device. Each of radio fingerprint observation report may contain a respective time stamp representing the capture time, for example in Unix time or as combined date and time representation as specified in the ISO 8601 specification.

As disclosed above, the plurality of radio fingerprint observation reports may be provided to a positioning server for determining or updating a radio map for a predetermined environment like the public transportation building at least partially based on the plurality of radio fingerprint observation reports. The positioning server may be further configured to provide the radio map to the mobile device to enable the mobile device to estimate (e.g. determine) its position based on radio signals observed at a certain position of the apparatus if the apparatus is located within the predetermined environment.

At least some (e.g. each) of the plurality of radio fingerprint observation reports may not represent a respective observation position. For example, the mobile device may not be able to determine its respective observation position when capturing radio signal parameters of observable radio signals in the public transportation building, for example because it is not possible to determine a GNSS-based position of the mobile device in the public transportation building or because there is no radio map for the public transportation building available. However, without knowing the observation position of radio signal parameters represented by a certain radio fingerprint observation report, the positioning server cannot determine or update a radio map based on this radio fingerprint observation report.

The disclosed method may further comprise:

associating one or more of the plurality of radio fingerprint observation reports with at least one of the plurality of potential paths of the mobile device in the public transportation building for determining or updating a radio map of the predetermined public transportation building.

The one or more of the plurality of radio fingerprint observation reports may for example be one or more radio fingerprint observation reports of the plurality of radio fingerprint observation reports representing one or more radio signal parameters captured by the mobile device in the public transportation building and/or after the arrival time at the public transportation building and/or before the departure time from the public transportation building.

Associating one or more of the plurality of radio fingerprint observation reports with at least one of the plurality of potential paths of the mobile device in the public transportation building may be understood to mean that each of the one or more of the plurality of radio fingerprint observation reports is associated with a respective position on this potential path. Therein, the respective position on this potential path may then be considered (e.g. for determining or updating a radio map of the predetermined public transportation building) to be the respective observation position of the mobile device when the respective radio signal parameter(s) represented by the respective radio fingerprint observation report associated with the respective position on the path was/were captured by the mobile device.

For example, if each of the plurality of radio fingerprint observation reports represents a respective capture time, it may be determined, for each of the one or more of the plurality of radio fingerprint observation reports, at which position on the at least one of the plurality of potential paths of the mobile device in the public transportation building the mobile device was located at the respective capture time represented by the respective radio fingerprint observation report and this position may then be associated with the respective radio fingerprint observation report. For example, it may be possible to determine at which position on the one of the plurality of potential paths of the mobile device in the public transportation building the mobile device was located based on capture times represented by the plurality of motion data items as disclosed above and/or based on motion durations associated with the one or more edges of the subgraph representing this potential path as disclosed above.

The at least one of the plurality of potential paths of the mobile device in the public transportation building may be considered or determined to be the path of the mobile device in the public transportation building. As disclosed above, it may accordingly be the shortest potential path of the plurality of potential paths of the mobile device in the public transportation building and/or it may be one of the plurality of potential paths of the mobile device in the public transportation building that is determined to match (e.g. to best match) with the sequence or a subsequence of the sequence of motion activities indicated by the plurality of motion data items.

By associating one or more of the plurality of radio fingerprint observation reports with such a potential path of the mobile device in the public transportation building for determining or updating a radio map of the public transportation building, it is thus possible to determine for each radio signal parameter represented by the one or more of the plurality of motion data items a respective observation position even if it is not possible to determine a (e.g. GNSS based) observation position of the mobile device when the radio signal parameters are captured.

According to an exemplary embodiment of the invention, the public transportation building is one of an airport, a train station, a bus terminal or a ferry terminal.

According to an exemplary embodiment of the invention, each of the plurality of position data items represents a respective one of the following position parameters:

global navigation satellite system, GNSS, coordinates representing a GNSS position;

a cell identifier of a cellular communication;

an identifier of a wireless communication device.

GNSS coordinates may for example be position coordinates of a position of the mobile device captured (e.g. determined) by a GNSS sensor of the mobile device. Examples such a GNSS are GPS or Galileo.

A cell identifier may be understood to be a Cell ID (CID) or UTRAN Cell ID (LCID) in a cellular communication network like a 2G/3G/4G/5G cellular communication network. The 2G/3G/4G/5G cellular radio communication standards are developed by the 3GPP and presently available under http://www.3gpp.org/. Such a cell identifier may be captured by extracting the cell identifier from a radio signal received by a radio interface like a cellular communication interface of the mobile device.

A wireless communication device may be understood to be a radio device like an access point of a wireless local area network (WLAN) or a Bluetooth beacon. WLAN is for example specified by the standards of the IEEE 802.11 family (http://www.ieee.org/). The Bluetooth standards are specified by the Bluetooth Special Interest Group and are presently available under https://www.bluetooth.com/. An example for identifier of a wireless communication device is a name like a name, an address (e.g. a MAC address or an IP address), an universally unique identifier (UUID), a service set identifier (SSID), a basic service set identifier (BSSID), or a combination thereof. Such an identifier of a wireless communication device may be captured by extracting the identifier from a radio signal transmitted by the wireless communication device, for example received by a radio interface like a wireless communication interface of the mobile device.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
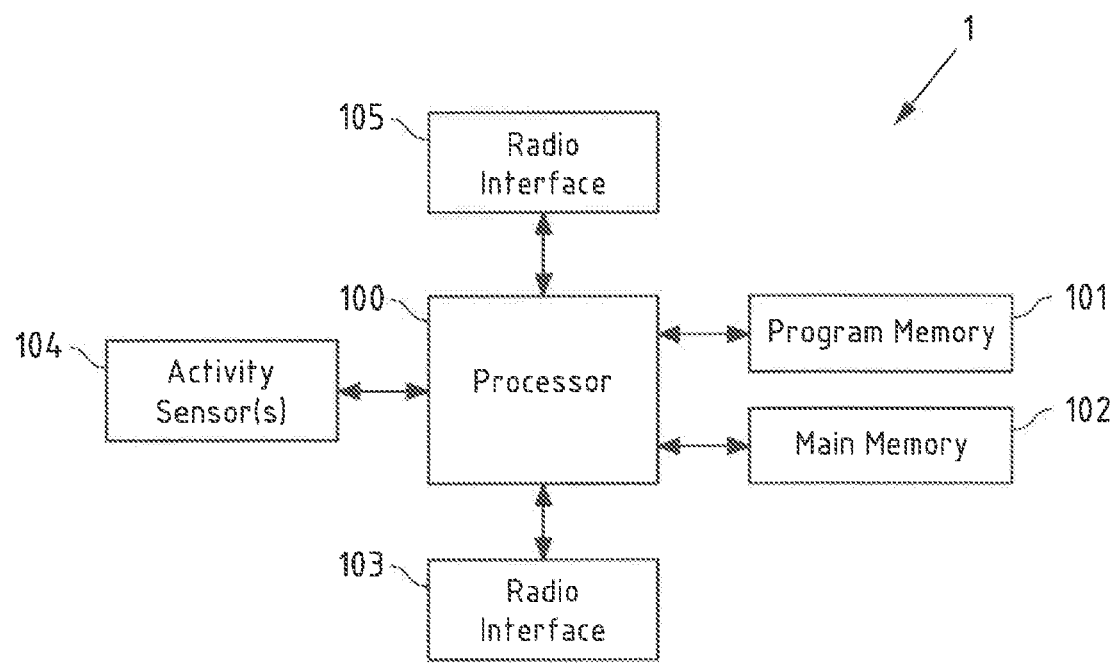
FIG. 1 is a block diagram of an exemplary embodiment of a mobile device according to the invention.

FIG. 1 is a block diagram of an exemplary embodiment of mobile device 1 according to the invention.

Mobile device 1 comprises a processor 100. Processor 100 may represent a single processor or two or more processors, which are for instance at least partially coupled, for instance via a bus. Processor 100 executes a computer program code stored in program memory 101 (e.g. computer program code causing mobile device 1 to perform any one embodiment of the disclosed method (e.g. the steps of any one embodiment of the disclosed method) or a part thereof (e.g. at least some steps of any one embodiment of the disclosed method) (as for instance further described below with reference to FIG. 2), when executed on processor 100), and interfaces with a main memory 102. Program memory 101 may also contain an operating system for processor 100 and serves for storing a plurality of motion data items, a plurality of position data items and a plurality of radio fingerprint observation reports. Some or all of memories 101 and 102 may also be included into processor 100. One of or both of memories 101 and 102 may be fixedly connected to processor 100 or at least partially removable from processor 100, for example in the form of a memory card or stick.

A program memory (e.g. program memory 101) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 102) may for example be a volatile memory. It may for example be a DRAM memory, to give non-limiting example. It may for instance be used as a working memory for a processor (e.g. processor 100) when executing an operating system and/or programs.

Processor 100 further controls a radio interface 103 configured for receiving and, optionally, transmitting radio signals. A radio interface may be or may comprise a radio receiver circuit and/or a radio transmitter circuit and/or a radio transceiver circuit. Such circuits may comprise modulators, filters, mixers, switches and/or one or more antennas to allow transmission and/or reception of radio signals.

In the following, it is assumed for exemplary purposes that radio interface 103 is a BLE transceiver configured to transmit and receive BLE radio signals in line with any current or future version of the Bluetooth standard supporting a low energy mode. Radio interface 103 enables mobile device 2 to repeatedly scan for observable BLE radio signals transmitted (e.g. broadcasted) by BLE beacons. Therein, a BLE radio signal may be understood to be observable if the BLE radio signal is receivable with a minimum quality (e.g. a minimum signal-to-noise ratio and/or a minimum signal power, e.g. at least −90 dBm or −95 dBm). Moreover, the BLE transceiver is configured, alone or together with processor 100, to capture one or more radio signal parameters of BLE radio signals observed (e.g. received) when scanning for observable radio signals. To this end, the BLE transceiver may for example extract, from each observed BLE radio signal, the respective UUID contained therein and measure the respective received signal strength of each observed BLE radio signal. The extracted UUIDs and the received signal strength values may then for example be provided to processor 100 as radio signal parameters. Processor 100 may then generate a radio fingerprint observation report representing the captured radio signal parameters and a capture time (e.g. as time stamp) indicating when these radio signal parameters were captured. It is to be understood that any computer program code required for receiving and processing received BLE radio signals may be stored in an own memory of the radio interface 103 and executed by an own processor of the radio interface 103 or it may be stored for example in memory 102 and executed for example by processor 100.

Moreover, processor 100 controls one or more activity sensors 104 configured for repeatedly capturing one or more motion parameters indicative of a motion activity of a user carrying the mobile device when the motion parameter is captured.

Examples of such activity sensors 104 are a speed sensor configured for capturing a speed value of the mobile device, an acceleration sensor configured for capturing an acceleration value of the mobile device, a step sensor configured for capturing a step length or step count of a user carrying the mobile device, a pressure sensor (e.g. a barometer) configured for capturing an atmospheric pressure experienced by the mobile device, an orientation sensor (e.g. a compass or gyroscope) configured for capturing an orientation of the mobile device, a motion direction sensor (e.g. a compass or gyroscope) configured for capturing a direction of a motion of the mobile device.

In the following, it is assumed that a motion parameter is indicative of one of the following motion activities: moving, walking, running, ascending, descending, turning, stationary, or a combination thereof. Moreover, it is assumed in the following that a motion parameter is determined based on one or more values of one or more physical quantities captured by activity sensors 104. For example, for each motion activity, one or more respective characteristic values or characteristic value ranges or characteristic changes in values of physical quantities may be predetermined such that one or more motion parameters captured by the one or more activity sensors of the mobile device may be determined to represent the respective motion activity if activity sensors 104 capture values of physical quantities matching these one or more respective characteristic values or characteristic value ranges or characteristic changes. To give a few non-limiting examples, a predetermined characteristic speed value for "stationary" may be a speed value equal to 0 km/h, a predetermined characteristic speed value range for "walking" may be a speed value greater than 0 km/h and less than 6 km/h, and a predetermined characteristic speed value range for "running" may be a speed value greater than or equal to 6 km/h and less than 12 km/h, a predetermined characteristic change of atmospheric pressure values for "descending" may be a (e.g. steady) increase of atmospheric pressure values, a predetermined characteristic change of atmospheric pressure values for "ascending" may be an (e.g. steady) decrease of atmospheric pressure values, a change of direction or orientation may be predetermined to be characteristic for "turning".

The motion parameter captured by activity sensors 104 may then for example be provided to processor 100; and processor 100 may then generate a motion data item representing the captured motion parameter and a capture time (e.g. as time stamp) indicating when this motion parameter was captured. It is to be understood that any computer program code required for capturing motion parameters may be stored in an own memory of the sensors 104 and executed by an own processor of the sensors 104 or it may be stored for example in memory 102 and executed for example by processor 100.

Processor 100 further controls radio interface 105 configured to communicate via a cellular communication network (e.g. to transmit and receive cellular radio signals). For example, radio interface 105 may be or may comprise a 2G/3G/4G/5G radio transceiver. Mobile device 1 may use radio interface 105 to repeatedly extract a cell identifier from received cellular radio signals.

As disclosed above, a cell identifier may be understood to be a Cell ID (CID) or UTRAN Cell ID (LCID) in a cellular communication network like a 2G/3G/4G/5G cellular communication network. Such a Cell ID may be considered to be indicative of the coarse position of the mobile device when the cellular radio signal representing the respective Cell ID is/was received, because it indicates that the (e.g. absolute) position of the mobile device is/was in the coverage area of the network node of the cellular communication network transmitting the cellular radio signal containing the respective Cell ID. Therein, the coverage areas of the network nodes of the cellular communication network may be known and, thus, considered to be predetermined areas. Accordingly, the extracted cell identifier may be provided to processor 100 as position parameter. Processor 100 may then generate a position data item representing the captured position parameter and a capture time (e.g. as time stamp) indicating when this position parameter was captured. It is to be understood that any computer program code required for capturing position parameters may be stored in an own memory of the radio interface 105 and executed by an own processor of the radio interface 105 or it may be stored for example in memory 102 and executed for example by processor 100.

The components 101 to 105 of mobile device 1 may for instance be connected with processor 100 by means of one or more serial and/or parallel busses.

It is to be understood that mobile device 1 may comprise various other components like a user interface for receiving user input or a GNSS sensor.

Figure 2:
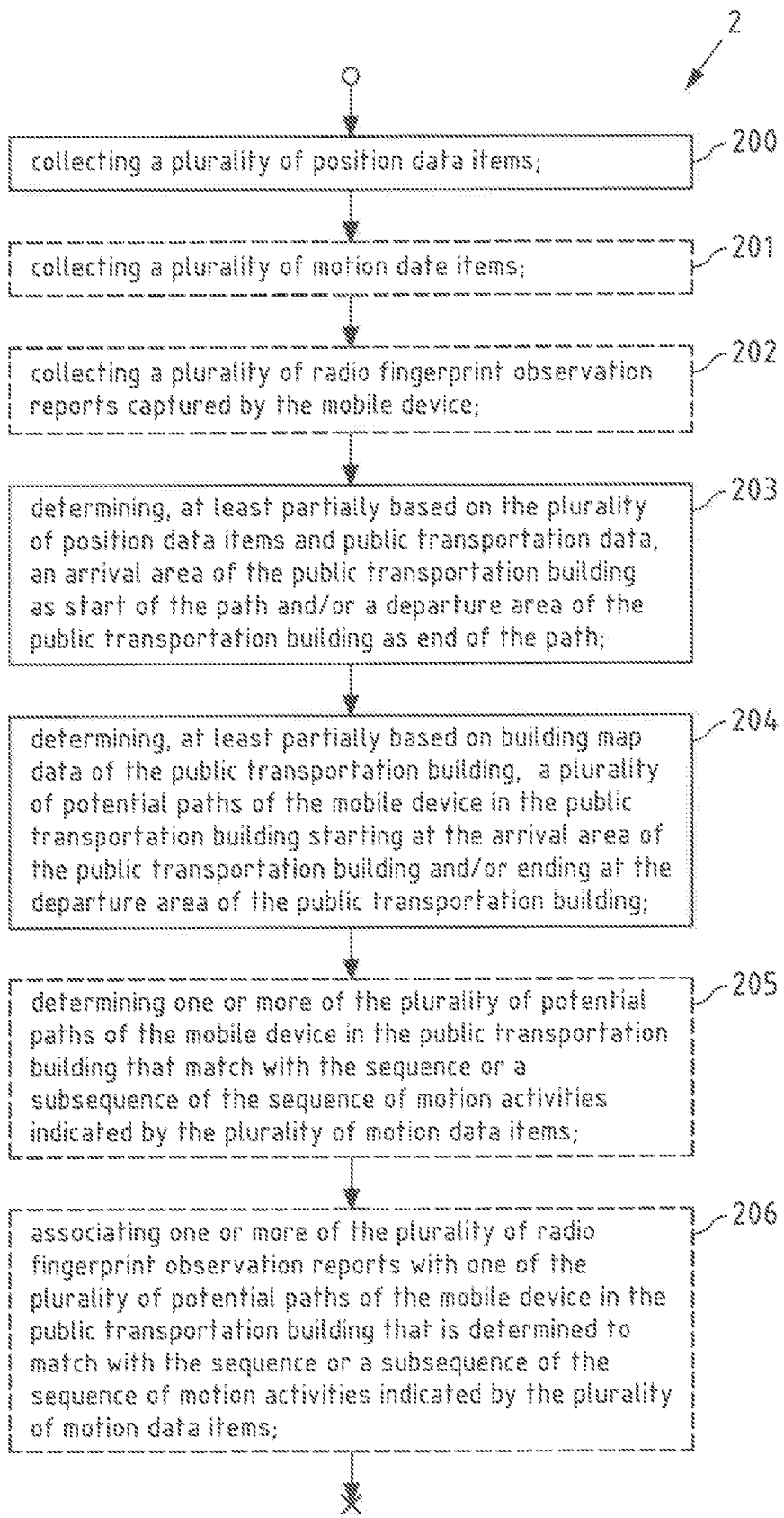
FIG. 2 is a flow chart illustrating an exemplary embodiment of a method according to the invention.

FIG. 2 is a flow chart 2 illustrating an exemplary embodiment of a method according to the invention. It is assumed in the following that the public transportation building is train station A. In the following, it is assumed that train station A is part of a public transportation system comprising trains station A, B, C, D. A route map of this public transportation system is represented by graph 4 shown in FIG. 4. It is however to be understood that the invention is not limited to this.

For example, train station A may be understood to be a public transportation building for which a non-GNSS based indoor positioning system as disclosed above is provided which is in the training stage. It is to be understood that train station A may be part of a plurality of predetermined public transportation buildings for which it is predetermined that the method according to flow chart 2 should be applied with respect to them.

Without limiting the scope of the invention, it is moreover assumed in the following that mobile device 1 as described above with respect to FIG. 1 performs the steps of flow chart 2. However, it is to be understood that a server like a positioning server of the non-GNSS based indoor positioning system provided for train station A may perform the steps of flow chart 2 equally well.

In a step 200 a plurality of position data items are collected by mobile device 1, wherein each of the plurality of position data items represents a respective position parameter captured by mobile device 1 that is indicative of a coarse position of mobile device 1 at which mobile device 1 was located when the respective position parameter was captured by the mobile device.

Collecting a plurality of position data items may be understood to mean that position data items subsequently generated by (e.g. processor 100 of) mobile device 1 are stored in program memory 101 of mobile device 1.

As disclosed above, each of the plurality of position data items represents a respective capture time (e.g. as time stamp) and respective Cell ID as position parameter which is indicative of the respective coverage area of the network node of the cellular communication system which covers the (e.g. absolute) position of the mobile device when the respective Cell ID was captured by the mobile device. The coverage areas of the network nodes of the cellular communication network are known and, thus, may be considered to be predetermined areas.

In an optional step 201, a plurality of motion data items are collected by mobile device 1, wherein each of the plurality of motion data items represents a respective motion parameter captured by mobile device 1 that is indicative of a respective motion activity of a user carrying mobile device 1 when the respective position parameter was captured such that the plurality of motion data items is indicative of a sequence of motion activities.

Collecting a plurality of motion data items may be understood to mean that motion data items subsequently generated by (e.g. processor 100 of) mobile device 1 are stored in program memory 101 of mobile device 1.

As disclosed above, each of the plurality of motion data items represents a respective capture time (e.g. as time stamp) and a respective motion parameter that is indicative of one of the following motion activities: moving, walking, running, ascending, descending, turning, stationary, or a combination thereof.

In an optional step 202, a plurality of radio fingerprint observation reports captured by the mobile device are collected. Collecting a plurality of radio fingerprint observation reports may be understood to mean that radio fingerprint observation reports subsequently generated by (e.g. processor 100 of) mobile device 1 are stored in program memory 101 of mobile device 1.

As disclosed above, each of the radio fingerprint observation reports may represent one or more respective UUIDs and received signal strengths as respective radio signal parameters and a respective capture time (e.g. as time stamp).

In a step 203, an arrival area of train station A as start of the path and/or a departure area of train station A as end of the path is determined at least partially based on the plurality of position data items and public transportation data by mobile device 1.

The public transportation data may be stored in program memory 101 and may represent a public transportation timetable for train station A and a route map of the public transportation system comprising train stations A, B, C and D.

Figures 3, 4:
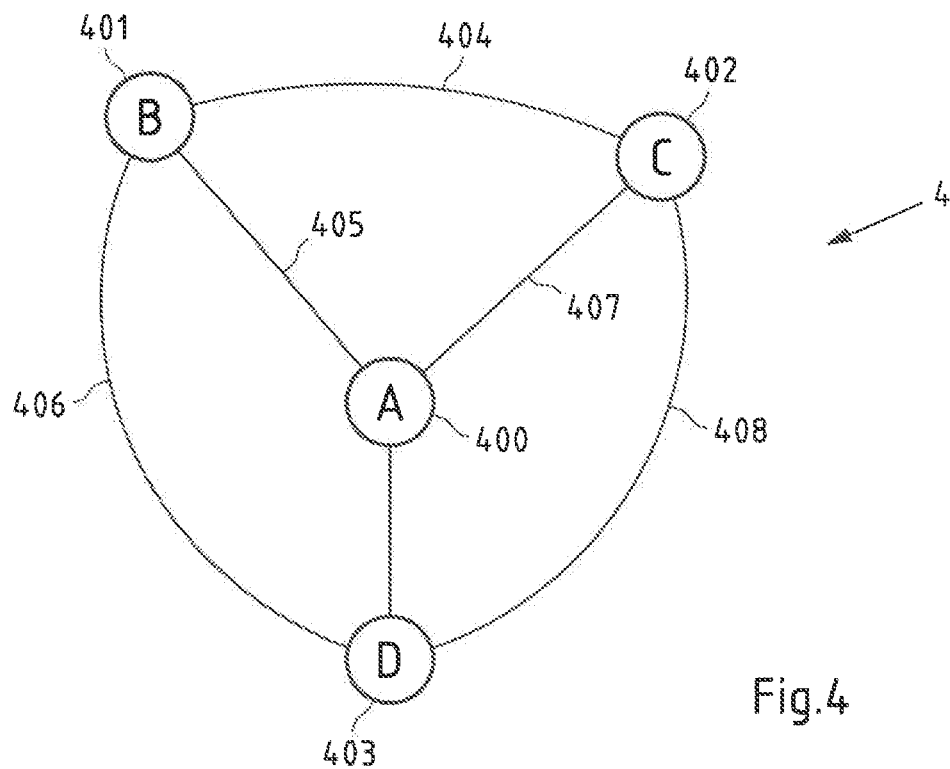
FIG. 3 shows an exemplary embodiment of a public transportation timetable represented by public transportation data according to the invention.
FIG. 4 shows an exemplary embodiment of a graph representing a route map of a public transportation system represented by public transportation data according to the invention.

An exemplary embodiment of a public transportation timetable 3 for train station A is shown in FIG. 3. As apparent from FIG. 3, the column "arrives from train station" of public transportation timetable 3 represents the previous station on the travel route of a train arriving at train station A, the column "departs to train station" of public transportation timetable 3 represents the next station on the travel route of a train departing from train station A, the column "departure time" of public transportation timetable 3 represents a departure time of a train departing from train station A (i.e. a departure time schedule), the column "arrival time" of public transportation timetable 3 represents an arrival time of a train arriving at train station A (i.e. an arrival time schedule), and the column "arrives on/departs from platform" represents an arrival or departure area for passengers of a train arriving at and/or departing from train station A.

As disclosed above, a route map of a public transportation system may be represented by a graph. An exemplary embodiment of a graph 4 representing a route map of the public transportation system comprising train stations A, B, C and D is shown in FIG. 4. Graph 4 comprises nodes 400 to 403 (i.e. a plurality of nodes) and edges 404 to 408 (i.e. a plurality of edges), wherein each of the nodes 400 to 403 represents a respective station of the public transportation system and each of the edges 404 to 408 represents a link between two stations of the public transportation system. For example, node 400 represents train station A and edge 404 represents a link between train stations B and C.

In the following, it is assumed that the public transportation data represent timetable 3 for train station A as shown in FIG. 3 and graph 4 as shown in FIG. 4 as representation of the route map of the public transportation system. Moreover, it is assumed in the following that the public transportation data represent the respective position of each of the train stations A, B, C and D (e.g. in the form of geographic coordinates). It is however to be understood that the present invention is not limited to this.

Based on this public transportation data and the plurality of position data items, the determining in step 203 may comprise determining:
  one or more stations of the public transportation system at which mobile device 1 was located;
  a respective arrival time of mobile device 1 at train station A;
  a respective departure time of mobile device 1 from train station A;
  at least one potential travel route of mobile device 1 in the public transportation system comprising train stations A, B, C and D.

As disclosed above, each of the plurality of position data items represents a respective capture time (e.g. as time stamp) and respective Cell ID as position parameter which is indicative of the respective coverage area of the network node of the cellular communication system which covers the (e.g. absolute) position of the mobile device when the respective Cell ID was captured by the mobile device. Accordingly, the one or more stations of the public transportation system at which mobile device 1 was located may be determined by determining, for each train station of the public transportation system, whether the respective position of the respective station is equal to (i.e. within) a respective coverage area of a respective Cell ID represented by a respective position data item of the plurality of position data items. If it is determined that the respective position of the respective station is equal to (i.e. within) a respective coverage area of a respective Cell ID represented by a respective position data item of the plurality of position data items, it may be determined that the mobile device was located at the train station at the capture time represented by the respective position data item of the plurality of position data items. Accordingly, a chronological sequence of the one or more stations of the public transportation system representing the chronological sequence in which mobile device 1 was located at these one or more stations may be determined based on the capture times.

Moreover, if subsequent position data items of the plurality of position data items represent a respective Cell ID of a respective coverage area which is equal to (i.e. within which) the position of train station A represented by the public transportation data is, the arrival time of mobile device at train station A may be determined to be earliest capture time of the capture times represented by these subsequent position data items and the departure time of mobile device from train station A may be determined to be latest capture time of the capture times represented by these subsequent position data items.

At least one potential travel route of mobile device 1 in the public transportation system comprising train stations A, B, C and D may be determined based on graph 4 and the chronological sequence of the one or more stations of the public transportation system at which mobile device 1 was located.

In the following, it is assumed that it is determined in step 203 that mobile device lwas located at train station B, at train station A and at train station C in this chronological sequence. Furthermore, it may be assumed in the following that it is determined in step 203 that mobile device arrived at 08:01 at train station A and departed from train station A at 08:22. Accordingly, the at least one potential travel route of mobile device 1 may be determined to be represented by the subgraph of graph 4 comprising nodes 401, 400, 402 and edges 405, 407.

For determining an arrival area of train station A as start of the path and/or a departure area of train station A as end of the path, a match between this information and trains arriving at and departing from train station A as represented by the public transportation timetable 3 may be determined, for example by means of a matching algorithm. Under consideration of the above assumptions, it may for example be determined that mobile device 1 arrived onboard of train TR1 at platform X of train station A and departed onboard of train TR2 from platform Y of train station A. Accordingly, it is assumed in the following that platform X of train station A is determined as start of the path and platform Y of train station A is determined as end of the path in step 203.

In a step 204, a plurality of potential paths of the mobile device in the public transportation building starting at the arrival area of the public transportation building and/or ending at the departure area of the public transportation building are determined at least partially based on building map data of train station A by mobile device 1.

The building map data of train station A may be stored in program memory 101 and may represent a graph.

Figure 5:
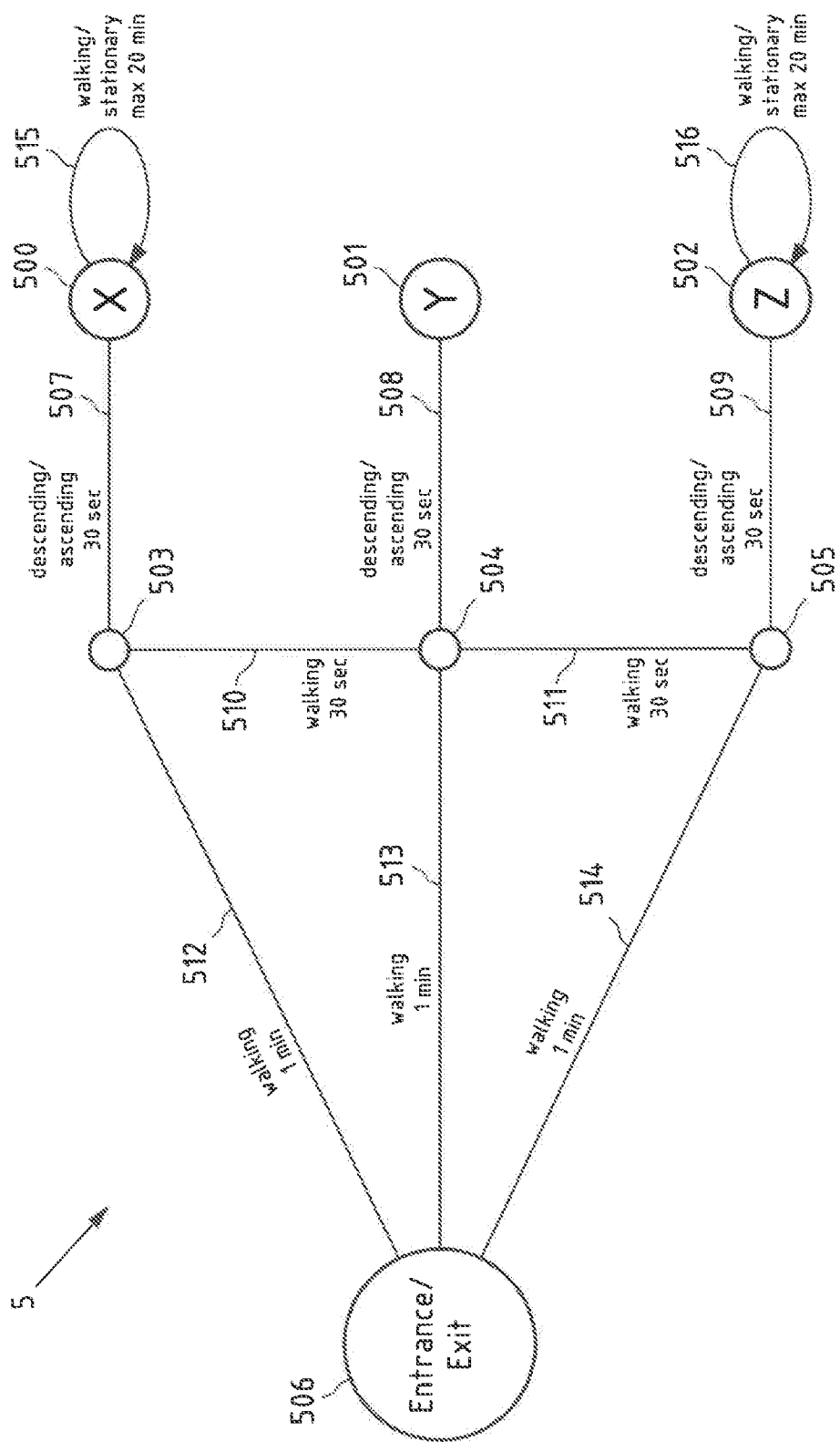
FIG. 5 shows an exemplary embodiment of a graph represented by building map data according to the invention.

An exemplary embodiment of a graph 5 represented by building map data of train station A is show in in FIG. 5. Graph 5 comprises nodes 500 to 506 (i.e. a plurality of nodes) and edges 507 to 516 (i.e. a plurality of edges).

Each of nodes 500 to 506 represents a respective location or a respective area of train station A. Examples of such a location of train station A are an entrance or an exit as represented by node 506 or an intersection of two or more interconnections as represented by nodes 503 to 505; and examples of such an area of train station A are platforms X to Z as represented by nodes 500 to 502.

Each of edges 507 to 514 represent an interconnection between the area(s) and/or location(s) represented by the two nodes joined by the respective edge. Examples of such an intersection are a hallway, a stairway, an elevator or an escalator. In the following, it is assumed that each of edges 507 to 509 represents a respective escalator and that each of edges 510 to 514 represents a respective hallway. Edges 515 to 516 join a respective node of nodes 500 and 502 with itself (i.e. forming a loop); in the following it is assumed that they represent the possibility to stay at the respective platform represented by the respective node.

Optionally, each of edges 507 to 516 may be associated with at least one motion activity and a motion duration as indicated by the text adjacent to edges 507 to 516 in FIG. 5. The at least one motion activity associated with such an edge may be an expected motion activity of a person moving along the intersection represented by the edge and the motion duration associated with such an edge may represent how long it is expected to take for a person to move along the intersection represented by the edge. Under consideration of the above assumptions, each of edges 507 to 509 representing a respective escalator are associated with "ascending" or "descending" as motion activity and a motion duration of "30 sec", each of edges 510 and 511 representing a respective hallway are associated with "walking" as motion activity and a motion duration of "30 sec", each of edges 512 to 514 representing a respective hallway are associated with "walking" as motion activity and a motion duration of "1 min", and each of edges 515 to 516 representing the possibility to stay at the respective platform are associated with "walking" or "stationary" as motion activity and a motion duration of "max. 20 min".

In the following, it is assumed that the building map data represent graph 5 as shown in FIG. 5. Moreover, it is assumed in the following that the building map data represent the motion activities and the motion durations associated with edges 507 to 516 as indicated in FIG. 5. It is however to be understood that the present invention is not limited to this.

Based on graph 5 represented by the building map data, one or more (e.g. any) potential path between platform X as start of the path and platform Y as end of the path may be determined in step 204. Accordingly, each of the plurality of potential paths determined in step 204 may be represented by a subgraph of graph 5 starting at node 500 and ending at node 501.

In the following, it is assumed that the following potential paths forming the plurality of potential paths are determined in step 204:

a first potential path of the plurality of potential paths is represented by the following sequence: node 500, edge 507, node 503, edge 510, node 504, edge 508, node 501;

a second potential path of the plurality of potential paths is represented by the following sequence: node 500, edge 515, node 500, edge 507, node 503, edge 510, node 504, edge 508, node 501;

a third potential path of the plurality of potential paths is represented by the following sequence: node 500, edge 507, node 503, edge 512, node 506, edge 513, node 504, edge 508, node 501;

a fourth potential path of the plurality of potential paths is represented by the following sequence: node 500, edge 515, node 500, edge 507, node 503, edge 512, node 506, edge 513, node 504, edge 508, node 501.

In an optional step 205, one or more of the plurality of potential paths of mobile device 1 in the public transportation building that match with the sequence or a subsequence of the sequence of motion activities indicated by the plurality of motion data items are determined by mobile device 1.

As disclosed above, each of the plurality of motion data items represents a respective capture time (e.g. as time stamp) and a respective motion parameter that is indicative of one of the following motion activities: moving, walking, running, ascending, descending, turning, stationary, or a combination thereof. Only the motion data items of the plurality of motion data items representing capture times after the arrival time of mobile device 1 at train station A and before the departure time of mobile device 1 from train station A may be considered in step 205. In the following, it is assumed that these motion data items of the plurality of motion data items are indicative of the following subsequence of motion activities (i.e. a subsequence of the sequence of motion activities indicated by the plurality of motion data items): stationary for 19 minutes, descending for 35 seconds, walking for 1 minute, ascending for 25 seconds.

For example, the determining in step 205 may comprise determining, for all of the plurality of potential paths, the sequence of motion activities indicated by the subgraph representing the potential path of the plurality of potential paths that matches best with the subsequence of motion activities indicated by the plurality of motion data items as described above, for example by matching the number of motion activities and/or by matching the motion activities and/or by matching the motion durations of the motion activities.

The second and the third potential path of the plurality of potential paths determined in step 204 are represented by a subgraph comprising a sequence of four edges and, thus, indicate a number of four motion activities which corresponds to the number of motion activities indicated by the subsequence of motion activities indicated by the plurality of motion data items as described above. Accordingly, both the second and the third potential paths of the plurality of potential paths may be determined to match best with the subsequence of motion activities indicated by the plurality of motion data items as described above if only the number of motion activities is considered for the matching. However, if the motion duration and/or the motion activities are considered as well, the second potential path of the plurality of potential paths may be determined to match best with the subsequence of motion activities indicated by the plurality of motion data items as described above due to the motion activities and motion durations associated with the sequence of edges of the subgraph of graph 5 representing the second potential path.

The potential path(s) determined to best match with the subsequence of motion activities indicated by the plurality of motion data items as described above in step 204 may be considered or determined to be the path of mobile device 1 in train station A.

In an optional step 206, one or more of the plurality of radio fingerprint observation reports are associated with one of the plurality of potential paths of mobile device 1 in train station A that is determined to match with the sequence or a subsequence of the sequence of motion activities indicated by the plurality of motion data items by mobile device 1.

Only the radio fingerprint observation reports of the plurality of radio fingerprint observation reports representing capture times after the arrival time of mobile device 1 at train station A and before the departure time of mobile device 1 from train station A may be considered in step 206.

Associating one or more of the plurality of radio fingerprint observation reports with one of the plurality of potential paths of the mobile device in train station A that is determined to match with the sequence or a subsequence of the sequence of motion activities indicated by the plurality of motion data items may be understood to mean that each of the one or more of the plurality of radio fingerprint observation reports is associated with a respective position on this potential path. Therein, the respective position on this potential path may then be considered (e.g. for determining or updating a radio map of the predetermined public transportation building) to be the respective observation position of mobile device 1 when the respective radio signal parameter(s) represented by the respective radio fingerprint observation report associated with the respective position on the path was/were captured by mobile device 1.

For example, it may be determined, for each of the one or more of the plurality of radio fingerprint observation reports, at which position on the one of the plurality of potential paths of the mobile device in the public transportation building mobile device 1 was located at the respective capture time represented by the respective radio fingerprint observation report and this position may then be associated with the respective radio fingerprint observation report. For example, it may be possible to determine at which position of mobile device 1 on the one of the plurality of potential paths of mobile device 1 in train station A mobile device 1 was located based on capture times represented by the plurality of motion data items and/or based on motion durations associated with the one or more edges of the subgraph representing this potential path.

Considering the second potential path of the plurality of potential path and the subsequence of motion activities indicated by the plurality of motion data items (i.e. stationary for 19 minutes, descending for 35 seconds, walking for 1 minute, ascending for 25 seconds) as described above, it may for example be determined that a radio fingerprint observation report representing a capture time of 10 minutes after the arrival time of mobile device 1 at train station A is to be associated with a position on platform X represented by edge 515 joining node 500 with itself and another radio fingerprint observation report representing a capture time of 20 minutes after the arrival time of mobile device 1 at train station A is to be associated with a position on the intersection represented by edge 510.

Figure 6:
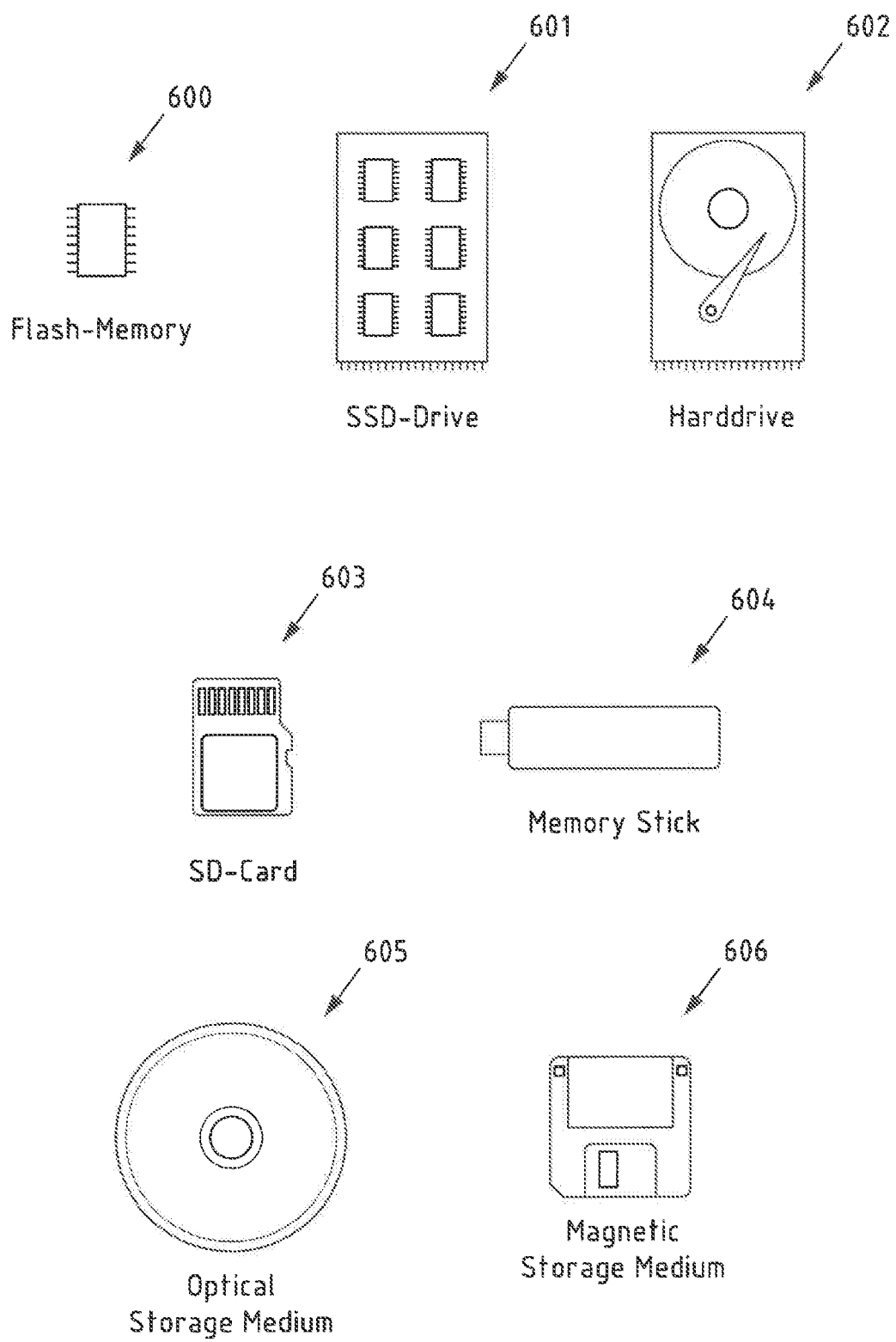
FIG. 6 is a schematic illustration of examples of tangible and non-transitory storage media according to the invention.

FIG. 6 is a schematic illustration of examples of tangible and non-transitory computer-readable storage media according to the present invention that may for instance be used to implement memory 101 of FIG. 1. To this end, FIG. 6 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 100 of FIG. 1 could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. Method for associating radio data with a travel path of a mobile device in a public transportation building, said method comprising:
    collecting a plurality of position data items, wherein each of the plurality of position data items represents a respective position parameter captured by said mobile device that is indicative of a coarse position at which said mobile device was located when said respective position parameter was captured by said mobile device, wherein capturing the respective position parameter comprises determining the respective position parameter at least partially based on a captured value of a physical quantity captured by a sensor of said mobile device; collecting a plurality of motion data items, wherein each of said plurality of motion data items represents a respective motion parameter captured by said mobile device that is indicative of a respective user motion activity of a user carrying said mobile device when said respective position parameter was captured by said mobile device such that said plurality of motion data items is indicative of a traveled sequence of motion activities;
    collecting radio data captured by said mobile device;
    determining, at least partially based on said plurality of position data items and public transportation data, an arrival area of said public transportation building as start of said travel path and/or a departure area of said public transportation building as end of said travel path;
    determining, at least partially based on building map data of said public transportation building, a plurality of paths in said public transportation building starting at said arrival area of said public transportation building and/or ending at said departure area of said public transportation building, wherein said building map data represents a graph comprising a plurality of nodes connected by respective ones of a plurality of edges and each path of the plurality of paths represents a respective subgraph of the graph, each subgraph comprising a respective at least two nodes of the plurality of nodes and a respective one or more edges of the plurality of edges, each edge of the respective one or more edges connects a respective two nodes of the respective at least two nodes;
    identifying the travel path from the plurality of paths that said mobile device traversed through said public transportation building, wherein identifying the travel path from the plurality of paths comprises determining the respective subgraph that best matches a traveled subgraph representing at least a portion of the traveled sequence of motion activities; and
    associating at least a portion of the radio data with the identified travel path,
    wherein at least one of said plurality of motion data items is further indicative of a user motion duration associated with the respective user motion activity, each edge of the plurality of edges is associated with a respective weight determined based on an edge motion activity and an edge motion duration corresponding to the edge motion activity, and the respective subgraph that best matches the traveled subgraph is determined based at least in part on the respective weight of the respective one or more edges of the subgraph and user motion activities and corresponding user motion durations of said plurality of motion data items corresponding to the traveled subgraph.

2. A method according to claim 1, wherein each of said plurality of position data items represents a respective capture time indicating when said respective position parameter was captured by said mobile device.

3. A method according to claim 1, wherein each of said plurality of motion data items represents a respective capture time indicating when said respective motion parameter was captured by said mobile device.

4. A method according to claim 1, wherein each of said plurality of paths in said public transportation building is indicative of or associated with a sequence of motion activities.

5. A method according to claim 1, wherein each subgraph representing a respective one of said plurality of paths is indicative of or associated with a respective sequence of motion activities.

6. A method according to claim 5, wherein one or more motion activities of said sequence of motion activities are at least one of moving, walking, running, ascending, descending, turning, stationary, or a combination thereof.

7. A method according to claim 1, wherein said public transportation data represents at least one of one or more positions of one or more stations in a public transportation system, a departure time schedule for public transportation vehicles, an arrival time schedule for public transportation vehicles, a route map of said public transportation system, arrival or departure areas for passengers of public transportation vehicles.

8. A method according to claim 1, wherein said determining said arrival area of said public transportation building as start of said travel path and/or said departure area of said public transportation building as end of said travel path comprises determining, at least partially based on at least one of said plurality of position data items and said public transportation data, at least one of:
- one or more stations of a public transportation system at which said mobile device was located according to one or more coarse positions of said mobile device indicated by one or more position parameters of said position parameters represented by said plurality of position data items;
- a respective arrival time of said mobile device at least one of said one or more stations of said public transportation system;
- a respective departure time of said mobile device from at least one of said one or more stations of said public transportation system;
- a travel time of said mobile device for travelling between at least two subsequent stations of said one or more stations; or
- at least one potential travel route of said mobile device in said public transportation system.

9. A method according to claim 8, wherein said public transportation building is one of said one or more stations, wherein said arrival area of said public transportation building is an arrival area for passengers of public transportation vehicles travelling on said travel route, and wherein said departure area of said public transportation building is a departure area for passengers of public transportation vehicles travelling on said travel route.

10. A method according to claim 1, wherein said radio data comprises one or more radio fingerprint observation reports, each of said one or more radio fingerprint observation reports represents a respective capture time indicating when said respective motion parameter was captured by said mobile device.

11. A method according to claim 1, said method further comprising:
- updating a radio map of said public transportation building based at least in part on the at least a portion of said radio data associated with the identified travel path.

12. An apparatus comprising at least one processor and at least one memory containing computer program code, wherein the at least one memory and the computer program code are configured, with the at least one processor, to cause the apparatus to perform at least the following:
- collecting a plurality of position data items, wherein each of the plurality of position data items represents a respective position parameter captured by said mobile device that is indicative of a coarse position at which said mobile device was located when said respective position parameter was captured by said mobile device, wherein capturing the respective position parameter comprises determining the respective position parameter at least partially based on a captured value of a physical quantity captured by a sensor of said mobile device;
- collecting a plurality of motion data items, wherein each of said plurality of motion data items represents a respective motion parameter captured by said mobile device that is indicative of a respective user motion activity of a user carrying said mobile device when said respective position parameter was captured by said mobile device such that said plurality of motion data items is indicative of a traveled sequence of motion activities;
- collecting radio data captured by said mobile device;
- determining, at least partially based on said plurality of position data items and public transportation data, an arrival area of a public transportation building as start of a travel path of said mobile device in said public transportation building and/or a departure area of said public transportation building as end of said travel path;
- determining, at least partially based on building map data of said public transportation building, a plurality of paths in said public transportation building starting at said arrival area of said public transportation building and/or ending at said departure area of said public transportation building, wherein said building map data represents a graph comprising a plurality of nodes connected by respective ones of a plurality of edges and each path of the plurality of paths represents a respective subgraph of the graph, each subgraph comprising a respective at least two nodes of the plurality of nodes and a respective one or more edges of the plurality of edges, each edge of the respective one or more edges connects a respective two nodes of the respective at least two nodes;
- identifying the travel path from the plurality of paths that said mobile device traversed through said public transportation building, wherein identifying the travel path from the plurality of paths comprises determining the respective subgraph that best matches a traveled subgraph representing at least a portion of the traveled sequence of motion activities; and associate at least a portion of the radio data with the identified travel path, wherein at least one of said plurality of motion data items is further indicative of a user motion duration associated with the respective user motion activity, each edge of the plurality of edges is associated with a respective weight determined based on an edge motion activity and an edge motion duration corresponding to the edge motion activity, and the respective subgraph that best matches the traveled subgraph is determined based at least in part on the respective weight of the respective one or more edges of the subgraph and user motion activities and corresponding user motion durations of said plurality of motion data items corresponding to the traveled subgraph.

13. An apparatus according to claim 12, wherein each of said plurality of position data items represents a respective capture time indicating when said respective position parameter was captured by said mobile device.

14. An apparatus according to claim 12, wherein each of said plurality of paths in said public transportation building is indicative of or associated with a sequence of motion activities.

15. An apparatus according to claim 12, wherein each subgraph representing a respective one of said plurality of potential paths of said mobile device in said public transportation building is indicative of or associated with a respective sequence of motion activities.

16. A non-transitory computer readable storage medium configured to store computer program code, wherein the computer program code is configured, upon execution by one or more processors, to cause an apparatus to:
- collect a plurality of position data items, wherein each of the plurality of position data items represents a respective position parameter captured by said mobile device that is indicative of a coarse position at which said mobile device was located when said respective position parameter was captured by said mobile device, wherein capturing the respective position parameter comprises determining the respective position parameter at least partially based on a captured value of a physical quantity captured by a sensor of said mobile device;

collect a plurality of motion data items, wherein each of said plurality of motion data items represents a respective motion parameter captured by said mobile device that is indicative of a respective user motion activity of a user carrying said mobile device when said respective position parameter was captured by said mobile device such that said plurality of motion data items is indicative of a traveled sequence of motion activities;

collect radio data captured by said mobile device;

determine, at least partially based on said plurality of position data items and public transportation data, an arrival area of a public transportation building as start of a travel path of said mobile device in said public transportation building and/or a departure area of said public transportation building as end of said travel path;

determine, at least partially based on building map data of said public transportation building, a plurality of paths in said public transportation building starting at said arrival area of said public transportation building and/or ending at said departure area of said public transportation building, wherein said building map data represents a graph comprising a plurality of nodes connected by respective ones of a plurality of edges and each path of the plurality of paths represents a respective subgraph of the graph, each subgraph comprising a respective at least two nodes of the plurality of nodes and a respective one or more edges of the plurality of edges, each edge of the respective one or more edges connects a respective two nodes of the respective at least two nodes;

identify the travel path from the plurality of paths that said mobile device traversed through said public transportation building, wherein identifying the travel path from the plurality of paths comprises determining the respective subgraph that best matches a traveled subgraph representing at least a portion of the traveled sequence of motion activities; and associate at least a portion of the radio data with the identified travel path, wherein at least one of said plurality of motion data items is further indicative of a user motion duration associated with the respective user motion activity, each edge of the plurality of edges is associated with a respective weight determined based on an edge motion activity and an edge motion duration corresponding to the edge motion activity, and the respective subgraph that best matches the traveled subgraph is determined based at least in part on the respective weight of the respective one or more edges of the subgraph and user motion activities and corresponding user motion durations of said plurality of motion data items corresponding to the traveled subgraph.

17. A method according to claim 1, wherein the at least a portion of the radio data comprises one or more radio signal parameters captured by said mobile device at an observation position along the travel path that the mobile device traversed through said public transportation building.

18. A method according to claim 1, wherein said public transportation data comprises a public transportation timetable and at least one of said arrival area of said public transportation building or said departure area of said public transportation building is determined based at least in part on a capture time associated with a position data item of said plurality of position data items.

19. A method according to claim 1, wherein a user motion activity is determined based on one or more (a) respective characteristic values, (b) characteristic value ranges or (c) characteristic changes in values of physical quantities and said respective motion parameter.

* * * * *